United States Patent [19]
van den Berg

[11] Patent Number: 5,862,776
[45] Date of Patent: Jan. 26, 1999

[54] APPARATUS FOR AUTOMATICALLY MILKING ANIMALS AND CLEANING TEATS

[75] Inventor: Karel van den Berg, Bleskensgraaf, Netherlands

[73] Assignee: Maasland N.V. a Dutch limited liability Company, Maasland, Netherlands

[21] Appl. No.: 798,119

[22] Filed: Feb. 12, 1997

[30] Foreign Application Priority Data

Feb. 13, 1996 [NL] Netherlands ............................ 1002319

[51] Int. Cl.⁶ ...................................................... A01J 7/04
[52] U.S. Cl. ........................ 119/14.1; 119/14.18; 119/651
[58] Field of Search ................................. 119/14.1, 14.02, 119/14.18, 663, 651, 670

[56] References Cited

U.S. PATENT DOCUMENTS 5,383,423  1/1995  van der Lely ................... 119/14.02 X
5,678,506  10/1997  van der Berg et al. ............ 119/670 X Primary Examiner—Robert P. Swiatek
Attorney, Agent, or Firm—Penrose Lucas Albright

[57] ABSTRACT

Apparatus for automatically milking animals in a milking compartment by means of teat cups on a robot arm that also includes a sensing device for locating the teats of the animal to be milked. The robot arm is automatically positioned longitudinally under the animal to be milked and includes a cleaning element which is connected thereto by a further arm member that can pivot relative to the robot arm about substantially horizontal and vertical axes. The cleaning member is pivotable from a position for cleaning the animal's teats to a further position displaced therefrom. The cleaning member includes a cover plate thereunder which is disposed under the cleaning member and above the teat cups mounted on the robot arm when in position for cleaning the animal's teats. The cleaning member comprises motor rotated parallel horizontal profiled spaced apart rollers and a spraying device is provided on the cleaning member for moistening the rollers. The cleaning member is pivoted to an inoperative position about the vertical axis and to a position for maintenance about the horizontal axis.

15 Claims, 2 Drawing Sheets

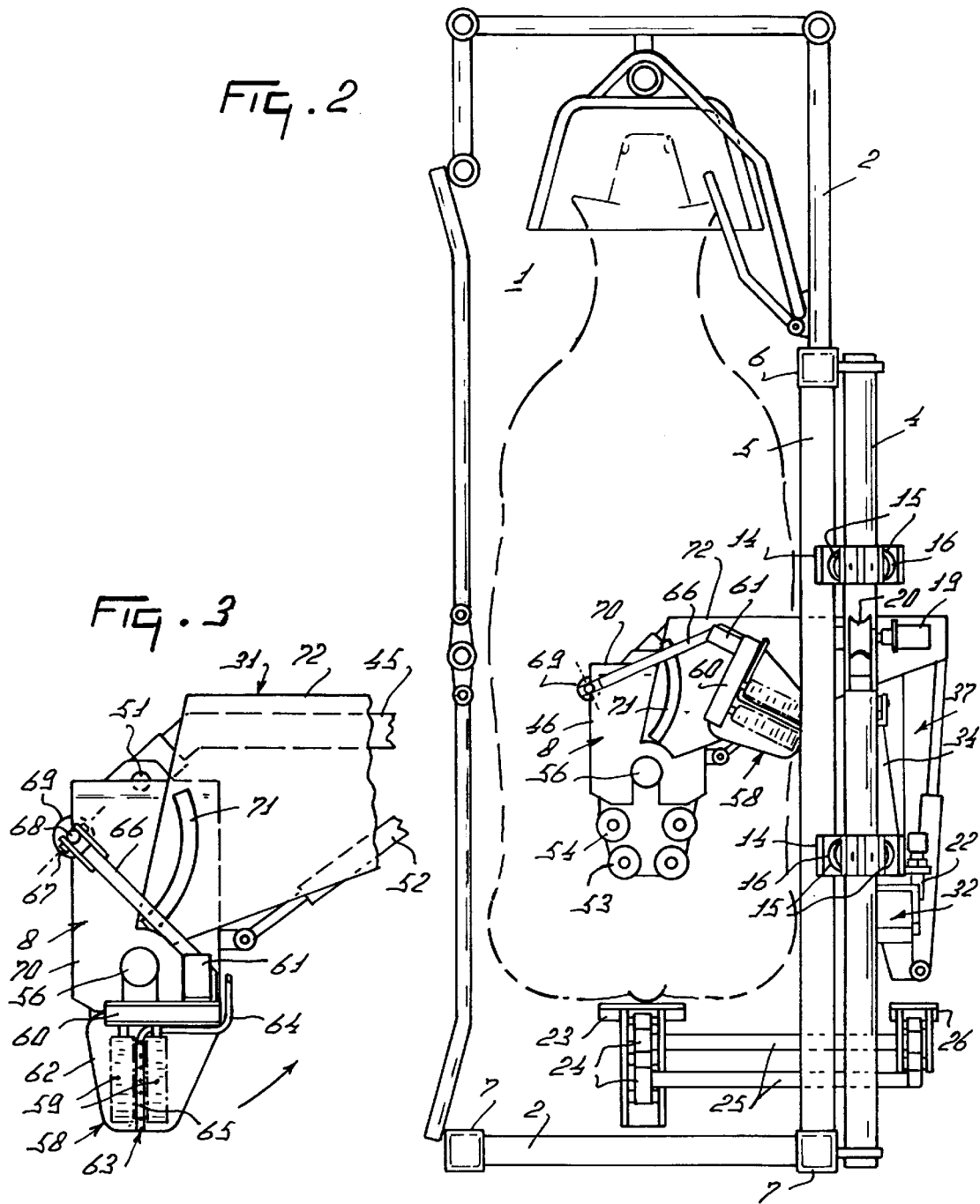

APPARATUS FOR AUTOMATICALLY MILKING ANIMALS AND CLEANING TEATS

FIELD OF INVENTION

The invention relates to an apparatus and method for automatically milking animals, comprising a milking robot, provided with one or more arms for carrying robot equipment, said robot equipment including teat cups, as well as a cleaning member for cleaning teats of an animal.

BACKGROUND OF THE INVENTION

Such an apparatus is known from Dutch Patent Application 9201734.

With the cleaning member described in said patent application the teats of the animal to be milked are cleaned by two cleaning rollers rotating in opposite directions between which rollers a teat is cleaned by the rubbing motion of the rollers.

Improvements to such apparatus are an object of this invention.

SUMMARY OF THE INVENTION

According to the invention the apparatus is characterized in that a cleaning member is provided on the robot arm construction so as to be movable relative to the teat cups. In this manner the cleaning member is pivoted together with the robot arm construction and consequently is available at all times for cleaning purposes. This produces a considerable gain of time, while furthermore coupling means are not necessary for coupling the cleaning member to the robot arm construction.

In accordance with further inventive feature the cleaning member is pivotally connected with an almost vertical shaft arranged on an outer arm of the robot arm construction. According to again another inventive feature the cleaning member is connected via an arm with the vertical shaft. In order to prevent the arm from sagging, in accordance with a further inventive feature of the arm is supported on a guide means disposed on the robot arm construction.

For the purpose of being able to clean the cleaning member or to repair same, according to another aspect of the invention the cleaning member is rotatable about an almost horizontal shaft located near vertical shaft. In accordance with another inventive feature the cleaning member is movable electrically or pneumatically from an inoperative position to an operative position. According to again another aspect of the invention, the cleaning member has a motor driven cleaning element. In a preferred embodiment in accordance with the invention the cleaning element comprises two motor-driven profiled rollers disposed next to each other and at some distance from each other. In order to avoid that during cleaning of the teats dirt gets into the teat cups, according to another inventive feature a cover plate is arranged under the cleaning member.

For the purpose of cleaning the cleaning element or moistening the teats or both, according to an inventive feature the cleaning member comprises a spraying device by means of which a cleaning or disinfecting fluid or both can be spread.

BRIEF DESCRIPTION OF THE DRAWINGS

For a better understanding of the invention and to show how the same may be carried into effect, reference will now be made, by way of example, to the accompanying drawings, in which:

FIG. 2 shows, in plan view, the apparatus shown in FIG. 1 in a position in which the cleaning member is brought under an animal present in the milking compartment; and FIG. 3 shows more in detail the cleaning member represented in FIGS. 1 and 2.

DESCRIPTION OF THE PREFERRED EMBODIMENTS

Figure 1:
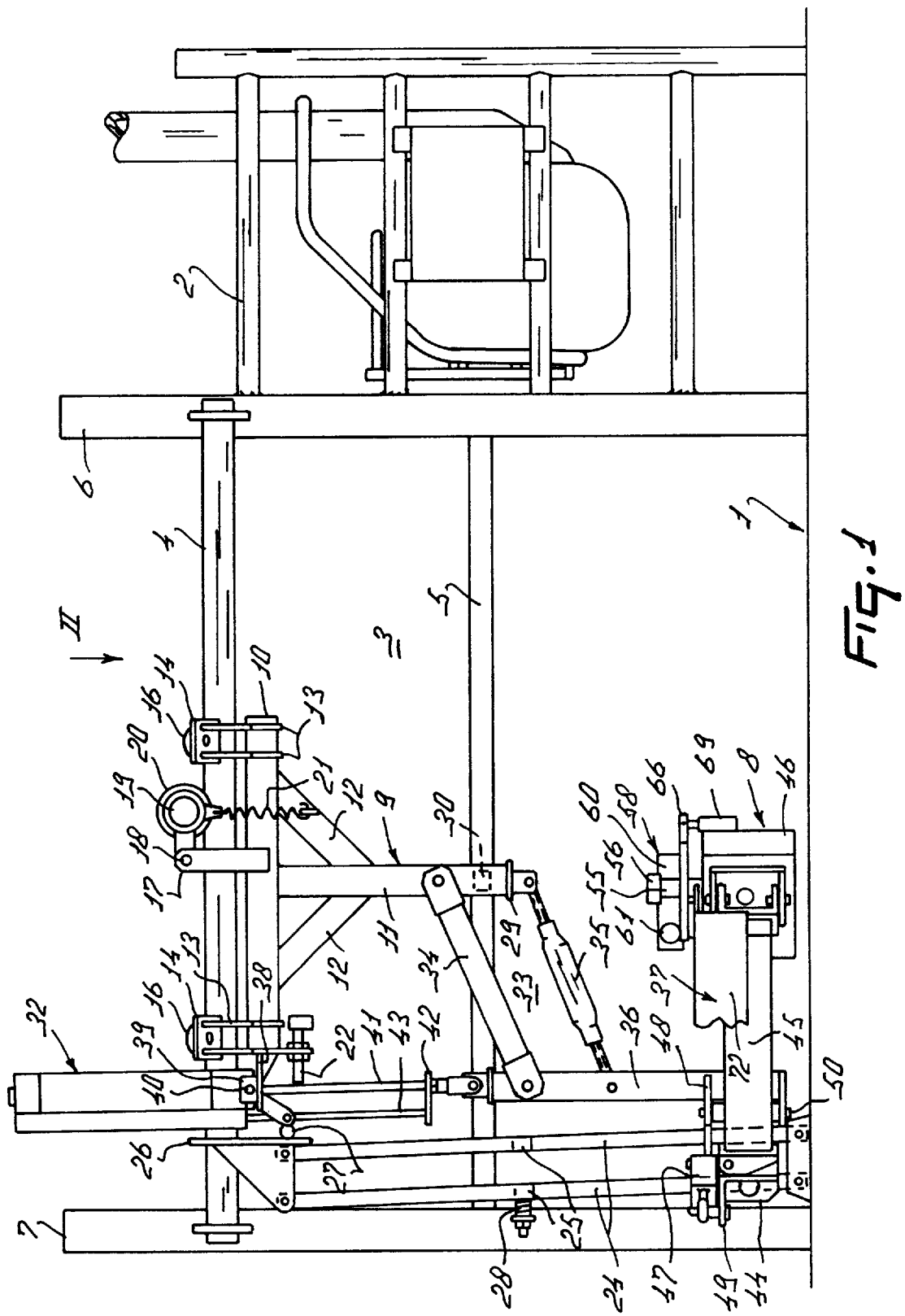
FIG. 1 shows a side view of the apparatus according to the invention.

The apparatus as shown in FIGS. 1 and 2 comprises a milking compartment 1, surrounded by a framework 2 allowing the animal a limited freedom of movement. The animal can enter the milking compartment via a longitudinal side near the rear thereof and leave same via the same longitudinal side near the front thereof. The front side of the milking compartment being provided with a feeding installation, the cow will advance sufficiently far and will come into a position in which she can be milked easily. At the other longitudinal side of the milking compartment, being opposite to the one including the entrance and exit, there is provided a fixed frame 3 constituting part of framework 2, which frame 3 includes a first frame part 4 and a second frame part 5. A first frame part 4 extends parallel to a second frame part 5 and is situated substantially thereabove. First frame part 4 is fixed to the outside of two vertical parts or stands 6 and 7 constituting part of framework 2, while second frame part 5 is fixed therebetween. To first frame part 4, there is movably attached a milking robot 8 for automatically milking animals. This milking robot 8 is supported against second frame part 5 disposed at such a height that arms of the milking robot 8 are movable below same and under the cow present in the milking compartment. Milking robot 8 comprises a carrier frame 9 for its further parts. By designing upper frame part 4 as a rail, the carrier frame 9, and consequently the entire milking robot 8, can easily be moved along this frame part. Carrier frame 9 includes a beam 10 extending substantially parallel to first frame part 4, a beam 11 directed vertically downwardly perpendicular to beam 10 and fixed thereto, and two struts 12. Provided near the ends of the beam 10, are pairs of supporting elements 13. To each pair of supporting elements 13, by means of supporting plates 14 fixed thereto, at an angle of approximately 45° two rollers 16, are provided constituting a rollers pair 15 arranged so that carrier frame is suspended whereby its is easily movable along the upper frame part 4. On beam 10 of carrier frame 9, on both sides, there are provided two carriers 17, to which is attached a motor 19 movable about a pivot shaft 18. Driven by this motor 19 is a roller 20, preferably having a rubber surface, which roller is urged against upper frame part 4 by means of a spring member 21. By this spring member 21 roller 20, driven by motor 19, is continually urged upper frame part 4, so that, when the motor is driven, it is moved along upper frame part 4, and consequently, the entire carrier frame 9 is so moved. To the supporting member 13, is attached a sensor 22 comprising a laser for example. By means of this sensor 22, it is possible to guide the milking robot, in the longitudinal direction of the milking compartment from an inoperative position to a starting position, in which the milking robot arms are moved under the animal present in the milking compartment, and caused to follow the movements of the animal in the longitudinal direction thereof. For that purpose, the sensor 22 cooperates with a supporting member 23 which is movable against the rear side of the animal. By means of a rod system which, in the present embodiment, is constituted by a quadrangle construction and, in particular, by a parallelogram construction 24, this supporting member 23 is pivotally arranged on the milking compartment's floor by means of two rods 25. Supporting member 23 is provided with a plate 26, extending outboard of frame parts 4 and 5 which plate 26 is arranged to reflect a signal transmitted by sensor 22. After sensor 22 receives the reflected signals, it transmits a control signal which is a measure for the actual, i.e. the measured distance between plate 26 and sensor 22. By means of this control signal, motor 19 moves milking robot 8 in the longitudinal directions of the milking compartment so that the distance between plate 26 and sensor 22 is maintained at a predetermined selected value. In its inoperative position, milking robot 8 is moved as far rearwardly as possible relative to frame parts 4 and 5, so that a contact element 27 bears against plate 26 and thus positioning supporting member 23 in its rearmost position. In other words, supporting member 23 is secured in its aftermost location by the milking robot 8 when the latter is in its inoperative position. When, in the longitudinal forward direction of the milking compartment, the milking robot moves from its inoperative position to its starting position, in which its arms are moved under the animal present in the milking compartment then supporting member 23 is no longer secured to the rear of milking compartment 1, and, by means of a compression spring 28 disposed between the parallelogram construction 24 and the framework 2, is resiliently caused to advance so that it bears against the buttocks of the cow then present in the milking compartment. Upon forward of backward movement of the cow, through the continuing pressure imparted by spring 28, supporting member 23 is always bearing against the rear side of the animal, so that the position of the plate 26 determines the longitudinal disposition of the animal in the milking compartment and, by means of sensor 22, while maintaining the predetermined spacing between plate 26 and sensor 22, the milking robot automatically follows the longitudinal movements of the cow in the milking compartment. In the present embodiments, beam 11 of carrier frame 9 extends vertically downwardly to somewhat below the second frame part 5. At the lower side of this beam 11 is disposed a horizontal, rearwardly extending strip 29 which is provided with a freely rotatably roller element 30. Lower frame part 5 is constituted by a rail, in particular one designed as a U-shaped beam, while the freely rotatable roller element 30 is arranged in so that it is movable between the two upright edges of the U-shaped beam. In this manner, milking robot 8 is supported by lower frame part 5 and when being moved by means of the motor over the first frame part 4, moves smoothly along second frame part 5. In addition to carrier frame part 9, the milking robot comprises a robot arm construction designated generally by reference numeral 31 which, by means of a control cylinder and piston unit 32, is movable substantially vertically relative to carrier frame 9. By means of a quadrangle construction 33, the robot arm construction 1 is movably connected with carrier frame 9. In the embodiment shown, the upper arm 34 of this quadrangle construction 33 has a fixed length, while the lower arm 35 thereof is adjustable in length so as to enable the robot arm construction 31 to be adjusted to a limited extent. The robot arm construction 31 comprises a substantially vertical robot arm 36 as well as robot arms 37 that are movable in a substantially horizontal plane. By means of quadrangle construction 33, robot arm 36 is connected with beam 11 of the carrier frame 9. Control cylinder and piston unit 32 is active between carrier frame 9 and robot arm 36. As, by means of the lower arm 35 of the quadrangle construction 33, the orientation of robot arm 36 is slightly adjustable, the spatial position of the action point of control cylinder and piston 32 at unit robot arm 36 is not entirely fixed. For that reason, the housing of the control cylinder and piston unit 32 is provided, at least pivotally to a limited extent, on a carrier plate 38 attached to beam 10 of carrier frame 9. On this carrier plate 38 are disposed supports 39, between which the housing of control cylinder and piston unit 32 is capable of being moved about a pivot shaft 40. In the present embodiment, control cylinder and piston unit 32 is designed as a servo-pneumatic positioning cylinder and piston unit. This means that, at the lower end of its piston rod 41, by means of a plate 42 fixed thereto, there is attached by position feedback rod 43, by means of which, in a connected part of the control cylinder and piston unit, a potentiometer transmits a signal indicating the position of the piston rod relative to the cylinder housing, while, with the aid of that signal, the position of the piston rod 41 relative to the cylinder housing is post-guided to a preset position. Furthermore, control cylinder and piston unit 32 is provided with an overload protection enabling robot arm construction 31 to be moved into its lowest position of an animal present in the milking compartment exerts pressure thereon, such as kicking it.

Milking robot 8 includes arms 44, 45 and 46. Arms 44 and 45 are arranged at a fixed angle of 90° relative to each other. Therefore, the latter arms are moved together. Such as by a control cylinder and piston member 47 provided between a supporting plate 48 attached to the robot arm 36 and a connecting plate 49 disposed between the two latter arms. Two arms 44 and 45 are pivotable about a substantially vertical pivot shaft 50 between supporting plate 48 and a supporting plate 48', which latter is also rigidly connected to the robot arm 36, more in particular at lower end thereof. Arm 46 is pivotable relative to the arm 45 about a substantially vertical pivot shaft 51 and is pivoted relative thereto by means of a control cylinder or piston combination 52 which is disposed between arm 46 and part of arm 45 that is situated near the connecting element 49. Near the end of arm 46 are a pair of teat cups 53 and another pair of forward teat cups 54 to be connected to the teats of the cow (see FIG. 1). Between the two teat cups 54 is disposed a slide 55, which is movable on arm 46 and on which is provided a sensor 56, which by a sectorwise scanning movement can accurately determine the position of the teats, so that the control cylinder and piston assemblies 32, 47 and 52 can be computer-controlled whereby the teat cups are connected properly to the teats. The robot arms 44, 45 and 46 having been brought to under the cow, they are in relatively low position, in which sensor 56 has not yet detected teats. By means of the control cylinder and piston members 32, robot arms 44, 45 and 46 are raised stepwise until sensor 55 detects one or more teats of the animal. If, during this upward movement, the robot arms 44, 45 and 46 area raised so that the upper side of sensor 56 bears against the cow's abdomen, then by means of a s switch 56' provided on the upper side of sensor 56, a downward movement of the robot arm is effected, whereafter, by means of sensor 56, while again stepwise raising the robot arm occurs, the procedure for ascertaining the position of the teats can be repeated.

For the purpose of cleaning the teats of an animal to be milked, the above-described apparatus is furthermore provided with a cleaning member 58. Cleaning member 58 comprises two juxtaposed profiled rollers 59, the shafts of which are pivotally bearing-supported in a gearbox 60. The profiled rollers 59 are driven by an electric motor 61 attached to a side of gearbox 60 Gearbox 60 is mounted on a cover plate 62 extending to under the profiled rollers 59. Between profiled rollers 59 is disposed a spraying device 63 by means of which profiled rollers 59 or the teats of an animal to be milked can be cleaned. Spraying device 63 includes a line 64 via which the spraying fluid can be supplied. Between profiled rollers 59, the line 64 is provided with a number of perforations 65 via which the spraying fluid is discharged from line 61. Line 64 is provided on cover plate 62. Via a striplike arm 66 the cleaning member 58 is connected with arm 46 of the robot arm construction 31. One end of arm 66 is fixedly connected with cover plate 62 and the other end thereof is connected pivotally about a substantially horizontal shaft 67 with a vertical shaft 68 of an electric motor 69. Motor 69 is disposed in a recess of a hood 70 of arm 46.

For the purpose of being able to carry out maintenance work of cleaning member 58, the latter is capable of being pivoted upwards about horizontal shaft 67. With the aid of electric motor 69 cleaning member 58 can be pivoted from an inoperative position, as shown in FIG. 2, to an operative position, as indicated in FIG. 3. In order to prevent arm 66 from sagging, a curvelike guide strip 71 is disposed on a hood 72 which is connected to arm 45. Arm 66 rests permanently on guide strip 71. In order to secure cleaning member 58 both in the inoperative position and in the operative position, there are provided blocking means on guide strip 71. In this manner electric motor 69 does not have to be permanently energized.

Hood 72 is provided on the further arm 45 of the robot arm construction 31, above which cleaning member 58 is received in its inoperative position. It is possible to dispose a boxlike housing on hood 72 in which cleaning member 58 can be stored in its inoperative position. This has the advantage that the boxlike housing there may be provided cleaning elements, such as brushes, by means of which the cleaning elements can be cleaned.

In order to avoid that, during cleaning of the teats, cleaning fluid supplied through the line 64 via the cover plate 62 gets into teat cups 53 and 54, the edges of the cover plate 62 may be provided with an upright portion and a discharge line for discharging the cleaning fluid.

The above-described embodiments of the cleaning member can be applied not only in combination with the apparatus for automatically milking animals, but also separately.

Although I have disclosed the preferred embodiment of my invention, it should be understood that it is capable of other adaptations and modifications within the scope of the following claims:

What is claimed is:

1. An apparatus for automatically milking animals, comprising a milking robot, said milking robot including at least one robot arm carrying teat cups and a cleaning member for cleaning the teats of an animal, said cleaning member being provided on said at least one robot arm so as to be movable as a unit relative to the teat cups.

2. An apparatus in accordance with claim 1, comprising a substantially vertical shaft which is interconnected to said at least one robot arm, said cleaning member being pivotable about said vertical shaft.

3. An apparatus in accordance with claim 1, comprising a substantially vertical shaft, said at least one robot arm comprising an inner arm and an outer arm, said cleaning member being pivotable about said substantially vertical shaft, said vertical shaft being arranged on said outer arm.

4. An apparatus in accordance with claim 1, comprising a substantially vertical shaft interconnected with said at least one robot arm, said cleaning member comprising an arm member which is pivotably connected to said vertical shaft.

5. An apparatus in accordance with claim 1, which comprises a guide means supporting said arm member, said guide means being disposed on said at least one robot arm.

6. An apparatus in accordance with claim 4, comprising a substantially horizontal shaft proximate said vertical shaft, said arm member being pivotably connected to said horizontal shaft.

7. An apparatus in accordance with claim 6, comprising a motor which is connected to said cleaning member for moving said cleaning member from an inoperative position to an operative position.

8. An apparatus in accordance with claim 1, comprising a substantially horizontal shaft, said cleaning member being pivotably connected to said horizontal shaft.

9. An apparatus in accordance with claim 1, wherein said cleaning member comprises a motor for driving said cleaning member.

10. An apparatus in accordance with claim 1, wherein said cleaning member comprises two motor-driven profiled substantially parallel spaced apart rollers.

11. An apparatus in accordance with claim 1, comprising a cover plate which is disposed under said cleaning member, and when said cleaning member is in an operative position for cleaning the teats of an animal, said cover plate is disposed over said teat cups.

12. An apparatus in accordance with claim 1, wherein said cleaning member comprises at least one motor driven cleaning element and a spraying device which moistens said at least one cleaning element.

13. A method for cleaning the teats of an animal in a milking compartment where the animal is being milked automatically, the method comprising moving rotatable cleaning members as a unit relative to teat cups which are not connected to the animal's teats so that said cleaning members are disposed on opposite sides of the animal's teats, rotating said cleaning members on opposite sides of each of the animal's teats and providing a cover plate near the circumference of said cleaning members.

14. A method for cleaning the teats of an animal in a milking compartment where the animal is to be milked automatically and the teat cups for milking the animal are not connected to the animal's teats, the method comprising moving a robot arm with a cleaning member therein which is rotatably connected to said robot arm to adjacent the teats of said animal, moving said cleaning member on the robot arm relative to said teat cups selectively to the animal's teats for cleaning the teats and away from the animal's teats, and adjusting said robot arm within a horizontal plane so that opposite sides of said teats are simultaneously cleaned by said cleaning member.

15. A method for cleaning the teats of an animal in a milking compartment where the animal is being milked automatically and the teat cups for milking the animal are not connected to the animals teats, the method comprising moving a cleaning member relative to said teat cups to adjacent the animal's teats for cleaning them and adjusting the disposition of the mounting for said cleaning member relative to the longitudinal sides of said milking compartment.

* * * * *